UNITED STATES PATENT OFFICE.

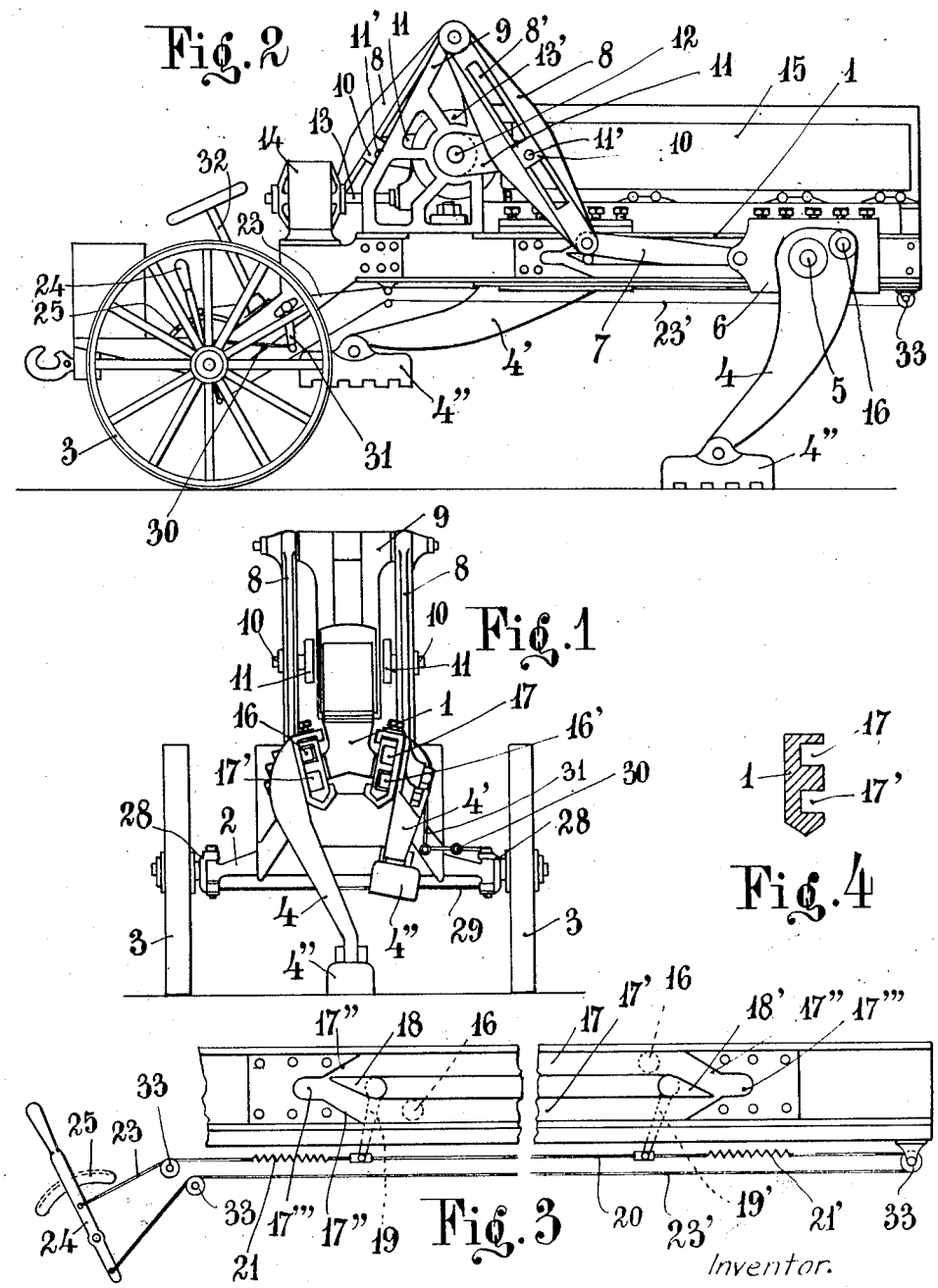

GIORGIO CASTELLA, OF CHIERI, ITALY, ASSIGNOR OF ONE-HALF TO VITTORIO LEVI, OF TURIN, ITALY.

TRACTOR.

1,356,964.  Specification of Letters Patent.  Patented Oct. 26, 1920.

Application filed August 20, 1919. Serial No. 318,637.

*To all whom it may concern:*

Be it known that I, GIORGIO CASTELLA, a subject of the King of Italy, and resident of Chieri, Italy, have invented certain new and useful Improvements in Tractors, of which the following is a specification.

This invention relates to improvements in tractors and has for its object a tractor in which the engagement with the ground and the propelling action are obtained by means of reciprocating parts so as to avoid the use of driving wheels and of the means required in connection with the same in known constructions for obtaining the requisite adherence to the ground in the case of heavy trailed loads.

The annexed drawing shows by way of example one form of tractor constructed according to this invention and Figure 1 is a front view of the same; Fig. 2 is a side view, Fig. 3 is a detail view on an enlarged scale showing the frame along which slides one of the reciprocating parts and Fig. 4 is a transverse section of a portion of said frame.

As shown by Figs. 1 and 2, the tractor comprises a longitudinal girder or frame 1 which at one end is connected with an axle 2 on which are mounted wheels 3; these wheels are mounted to operate as steering wheels, and as shown on the drawing they are journaled on steering knuckles 28 hinged to axle 2 and controlled by means of rods 29—30, lever 31 and steering pillar 32 in the well known manner.

Along frame 1 are mounted to reciprocate in opposite directions two legs 4 and 4' which are provided at their lower ends with swinging shoes 4'' adapted to rest on and to engage the ground.

As hereinafter described said legs during their stroke in one direction are adapted to engage the ground so as to operate as driving or propelling means, and during the opposite or return stroke they are moved away from the ground.

Each of legs 4—4' is pivoted at 5 to a block 6 adapted to slide along the adjacent side of the frame 1 and engaged therewith, and each block 6 is connected by means of a rod 7 with the end of a lever 8 having its upper end pivoted in a bracket 9 rigidly mounted on frame 1.

Each lever 8 is provided with a longitudinal slot 8' in which is mounted to reciprocate a sliding part or block 10 pivotally connected with a pin 11' carried by a crank 11 fixed to a shaft 12 which is operated by any suitable means, said cranks 11 being arranged at 180° apart from each other.

In the construction illustrated on the drawing said shaft 12 is operated by means of a gear wheel 13' driven by a worm (not shown) fixed to the shaft 13 of an electric motor 14 fed by a battery 15, but it is to be understood that said shaft 12 and cranks 11 may be operated by any other power, say by an explosion engine or the like, without departing from the scope of the invention.

Each leg 4—4' is provided, at its upper end with a stud 16—16' respectively, adapted to travel in a closed guideway provided in said frame and comprising upper and lower slots 17—17' which are straight and parallel with each other (see Figs. 3 and 4) and are connected at their adjacent ends by means of short inclined slots 17'' and recesses 17'''.

At the points where said slots 17—17' are connected are arranged switching points 18—18' pivoted in said frame and connected together by means of arms 19—19' and of a cord or rod 20 so that said points are moved at the same time and to the same extent in opposite directions.

The above described arrangement is provided in connection with each leg 4—4' and at each side of frame 1 as shown by Fig. 1.

The cord 20 connects together the arms 19 of the two sets of points, and both arms 19 are connected by means of a spring 21 with one end of a cord 23, while the two arms 19' are connected by means of a spring 21' with the end of a cord 23'. Said cords 23 and 23' pass over rollers 33 and are attached at their rear ends to a handle 24 provided with a locking quadrant 25; as shown in the drawing the said cords are attached to said handle at opposite sides of the fulcrum point thereof so as to be operated in opposite directions and to the same extent when said handle is shifted.

Instead of the above described arrangement an endless cord may be used, the same being connected with springs 21—21' and being operated by one of the rollers on which it is located.

By shifting handle 24 the position of the switch points 18—18′ may be reversed so as to reverse the travel of the studs 16—16′ along the portions 17—17′ of the corresponding guideway, and therefore the driving and return strokes of the legs 4—4′ are reversed with regard to each other.

The operation is as follows: When driving shaft 13 is operated, wheel 13′ is driven together with shaft 12 and cranks 11 so that levers 8 are caused to swing in opposite directions by the movements of the blocks 10 in the slots 8′ in said levers.

The motion of the lower ends of said levers is imparted by rods 7 to blocks 6 which are thus caused to reciprocate in opposite directions along frame 1 and each of said blocks carries with it its legs 4, 4′ which may be either raised or lowered, this depending upon its stud 16—16′ being engaged with either the upper slot or way 17 or with the lower one 17′ of the guideway.

Assuming that leg 4 is at the right end of its stroke and with its stud 16 in the way 17 (Figs. 1 and 3), said leg will then be in lowered position and its shoe 4″ engaged with the ground so that on the corresponding lever 8 being shifted to the left, a relative movement is produced between frame 1 and leg 4, which gives rise to motion of the tractor toward the right, due to leg 4 being engaged with ground and stationary with respect to the same. When lever 8 and leg 4 reach the opposite end of their stroke, stud 16 comes into engagement with slope 17″ and shifts point 18 so that said stud is free to enter recess 17‴, the point 18 being thereafter restored to its original position by spring 21. The motion of lever 8 and leg 4 now takes place in the opposite direction, leg 4 moving from left to right and its stud 16 entering the lower slope 17″ of way 17′ and traveling therein; the leg 4 is thus caused to swing around its pivot 5 and takes up the position of leg 4′ in Fig. 2, retaining this raised position during its return stroke toward the right, this stroke being produced by the like movement of lever 8.

It is advisable that the return stroke be made during the period in which block 10 is located in the upper portion of slot 8′ of lever 8, as in these conditions the leverage of block 10 with regard to the pivot of lever 8 is reduced and therefore a higher speed of lever 8 is obtained.

Therefore it is desirable to effect the normal or forward running during the period of operation corresponding with the lower half of revolution of cranks 11.

On block 6 and leg 4 reaching the right end of their stroke, stud 16 shifts point 18′ and enters recess 17‴ so that when the subsequent motion of block 6 toward left begins, the stud 16 is allowed to enter way 17 and therefore leg 4 is lowered and carried into engagement with the ground.

The operation of leg 4′ is identical with that described in connection with leg 4, said legs always moving in opposite directions with regard to each other because of the disposition of the driving cranks 11 at an angle of 180°, and one leg being raised when the other one is lowered and engaged with the ground.

In order to reverse the running of the tractor it is sufficient to reverse the operation of studs 16—16′ and points 18—18′ so as to obtain that legs 4 and 4′ are lowered and engaged with the ground during their opposite stroke with regard to the above described operation.

For this purpose handle 24 is shifted so as to cause points 18 to be lowered and points 18′ to be raised with regard to the position shown in Fig. 3. Then on leg 4 reaching the left end of its stroke and thereafter beginning its stroke toward the right, its stud 16 is prevented by point 18 from entering the lower way 17′ and is caused to travel again in upper way 17 so that leg 4 is engaged with the ground during this stroke and propels the tractor in the opposite direction with regard to the operation above described, while stud 16′ of leg 4′ is caused by point 18′ to travel again along way 17′ and the same holds said leg 4′ removed from the ground.

On reaching the right end of its stroke stud 16 shifts point 18′ and similarly stud 16′ shifts point 18 on reaching the left end of its stroke, so that the position of the two legs is reversed during their subsequent stroke and the reverse running of the tractor is thus obtained.

It is to be understood that for constructional purposes it is preferable to provide an independent slot 17—17′—17″—17‴ for each leg at each side of frame 1, but the same operation may be obtained by providing a single slot in which are engaged both studs 16—16′.

By means of the arrangement according to this invention the tractor or vehicle is propelled by means of reciprocating parts which operate like the legs of animals, the said parts being engaged with the ground during their operative stroke and being removed therefrom during their return stroke.

This allows of propelling the vehicle under all conditions as the legs engaging the ground grasp very firmly the same; further, the road is not worn along two distinct lines or tracks as is the case at present where driving wheels and the like are used, and by giving a proper inclination to the surfaces of frame 1 along which slide the blocks 6, the shoes 4″ of legs 4 and 4′, may be caused to engage the road along the same line.

What I claim as my invention and desire to secure by United States Letters Patent is:—

1. A tractor comprising a frame having supporting and steering means, blocks adapted to reciprocate along said frame, levers pivoted to said frame and each having a slot, a shaft having diametrically opposite crank arms, means for driving said shaft, members each slidable in the slot of one lever and connected with one of the crank arms to operate said levers by the rotation of said shaft, rods connecting each lever with one of said blocks to cause the same to reciprocate, legs each connected with one of said blocks and coöperating means on said legs and frame to cause each leg to engage the ground during its stroke in one direction and to be removed therefrom during its stroke in the opposite direction.

2. A tractor comprising a frame having supporting and steering means, parts adapted to reciprocate along said frame, means for operating said parts, legs each pivoted to one of said parts, guide ways in said frame each comprising two horizontal portions spaced apart vertically from each other and connected together at both ends by sloping portions, switching points at said connecting portions, and a stud fixed to each leg and engaging the adjacent guideway, said switching points causing said studs to enter one of said horizontal portions after having traveled along the other one to cause each leg to engage the ground during its stroke in one direction and to be removed therefrom during its stroke in the opposite direction.

3. A tractor comprising a frame having supporting and steering means, parts adapted to reciprocate along said frame, means for operating said parts, legs each pivoted to one of said parts, guide ways in said frame each comprising two horizontal portions spaced apart vertically from each other and connected together at both ends by sloping portions, spring controlled switching points at said connecting portions, a stud fixed to each leg and engaging the adjacent guideway, said switching points causing said studs to enter one of said horizontal portions after having traveled along the other one to cause each leg to engage the ground during its stroke in one direction and to be removed therefrom during its stroke in the opposite direction.

4. A tractor comprising a frame having supporting and steering means, parts adapted to reciprocate along said frame, means for operating said parts, legs each pivoted to one of said parts, guide ways in said frame each comprising two horizontal portions spaced apart vertically from each other and connected together at both ends by sloping portions, switching points at said connecting portions, a stud fixed to each leg and engaging the adjacent guideway, said switching points causing said studs to enter one of said horizontal portions after having traveled along the other one to cause each leg to engage the ground during its stroke in one direction and to be removed therefrom during its stroke in the opposite direction, and means for controlling said switching points to reverse their operation.

5. A tractor comprising a frame having supporting and steering means, parts adapted to reciproate along said frame, means for operating said parts, legs each pivoted to one of said parts, guideways in said frame each comprising two horizontal portions spaced apart vertically from each other and connected together at both ends by sloping portions, spring controlled switching points at said connecting portions, a stud fixed to each leg and engaging the adjacent guideway, said switching points causing said studs to enter one of said horizontal portions after having traveled along the other one to cause each leg to engage the ground during its stroke in one direction and to be removed therefrom during its stroke in the opposite direction and means for controlling said switching points for reversing their operation.

6. A tractor comprising a frame having supporting and steering means, parts adapted to reciprocate along said frame, means for operating said parts, legs each pivoted to one of said parts, guideways in said frame each comprising two horizontal portions spaced apart vertically from each other and connected together at both ends by sloping portions, switching points at said connecting portions, a stud fixed to each leg and engaging the adjacent guideway, said switching points causing said studs to enter one of said horizontal portions after having traveled along the other one to cause each leg to engage the ground during its stroke in one direction and to be removed therefrom during its stroke in the opposite direction, arms fixed to said switching points, means connecting said arms together and means for operating said arms to control said switching points for reversing their operation.

7. A tractor comprising a frame having supporting and steering means, parts adapted to reciprocate along said frame, means for operating said parts, legs each pivoted to one of said parts, guideways in said frame each comprising two horizontal portions spaced apart vertically from each other and connected together at both ends by sloping portions, switching points at said connecting portions, a stud fixed to each leg and engaging the adjacent guideway, said switching points causing said studs to enter one of said horizontal portions after having traveled along the other one to cause each leg to engage the ground during its stroke in one direction and to be removed therefrom during its stroke in the opposite direction, arms fixed to said switching points, operating means, and connecting means between said operating means and said arms for controlling the latter to reverse the operation of said switching points, springs being inserted in the last named connecting means.

Signed at Turin, Italy, this 6th day of August, A. D. 1919.

GIORGIO CASTELLA.